United States Patent [19]

Wahlstedt

[11] 4,263,995
[45] Apr. 28, 1981

[54] ELECTROMAGNETIC SPRING CLUTCH

[75] Inventor: Robert L. Wahlstedt, Roseville, Minn.

[73] Assignee: Reell Precision Manufacturing Corporation, St. Paul, Minn.

[21] Appl. No.: 883,156

[22] Filed: Mar. 3, 1978

Related U.S. Application Data

[63] Continuation-in-part of Ser. No. 749,738, Dec. 13, 1976, abandoned.

[51] Int. Cl.³ .................... F16D 27/10; F16D 41/20
[52] U.S. Cl. .................................. 192/35; 192/81 C; 192/84 T
[58] Field of Search ............... 192/35, 36, 81 C, 84 T, 192/84 C

[56] References Cited

U.S. PATENT DOCUMENTS

| 1,745,413 | 2/1930 | Forster | 192/84 C |
|---|---|---|---|
| 2,798,581 | 7/1957 | Supitilov | 192/84 T |
| 2,939,561 | 6/1960 | Rudisch | 192/81 C |
| 3,177,996 | 4/1965 | Bates | 192/35 |
| 3,185,276 | 5/1965 | Sajovec | 192/84 T |
| 3,216,392 | 11/1965 | Shimanckas | 192/84 T X |
| 3,349,880 | 10/1967 | Baer | 192/84 T |
| 3,684,068 | 8/1972 | Ford | 192/84 T |
| 3,735,847 | 5/1973 | Brucken | 192/35 |
| 3,905,458 | 9/1975 | Mehrbrodt | 192/35 |
| 3,926,286 | 12/1975 | Johnson | 192/26 X |
| 3,934,690 | 1/1976 | Janning | 192/84 T |
| 3,974,902 | 8/1976 | Wahlstedt et al. | 192/84 T |

FOREIGN PATENT DOCUMENTS

| 969833 | 12/1950 | France . |
| 1021985 | 3/1966 | United Kingdom . |
| 1442062 | 7/1976 | United Kingdom . |

*Primary Examiner*—Rodney H. Bonck

[57] ABSTRACT

Spring clutch is actuated by magnetic field applied radially between non-rotatable source and rotative clutch hub and spring-contracting ring.

8 Claims, 4 Drawing Figures

ELECTROMAGNETIC SPRING CLUTCH

This application is a continuation-in-part of copending application Ser. No. 749,738 filed Dec. 13, 1976, now abandoned.

This invention relates to electromagnetically actuated spring clutches wherein a helical torque-transmitting clutch spring carried by a rotating hub is caused to wrap down onto an axially adjacent hub by means of an applied magnetic field. Such clutches are useful in the controlled intermittent operation of numerous mechanical devices, e.g. printing or copying machines and other paper feed devices.

One method of operation of helical spring clutches, as shown for example in U.S. Pat. No. 3,926,286, involves releasing the spring from its initially driving contact with the input hub by means of an exterior floating sleeve which contacts the free end of the spring. Stopping the rotation of the sleeve expands or unwraps the spring so that torque is no longer transmitted to the output hub.

Analogous systems in which the action of the sleeve is employed to initiate wrapdown rather than release of the spring are also known. One such device, in which actuation of the sleeve is accomplished electromagnetically, is shown in U.S. Pat. No. 3,185,276. In this device the magnetic attraction between fixed and rotative components is applied axially between the poles of the fixed electromagnet and a radially extended end of the rotative control sleeve. As a result, frictional drag is introduced between fixed and rotating components, resulting in decreased efficiency and in eventual frictional wear.

It has now been found possible to reduce drag and wear, increase efficiency, and at the smae time simplify and otherwise improve the structure of small electromagnetically actuated spring clutch mechanisms, by employing as the spring control element a ferromagnetic ring mounted directly adjacent and attached to the free end coil of the helical spring, and by applying the magnetic flux radially between fixed and rotative components, all as will be hereinafter set forth.

Figure 1:
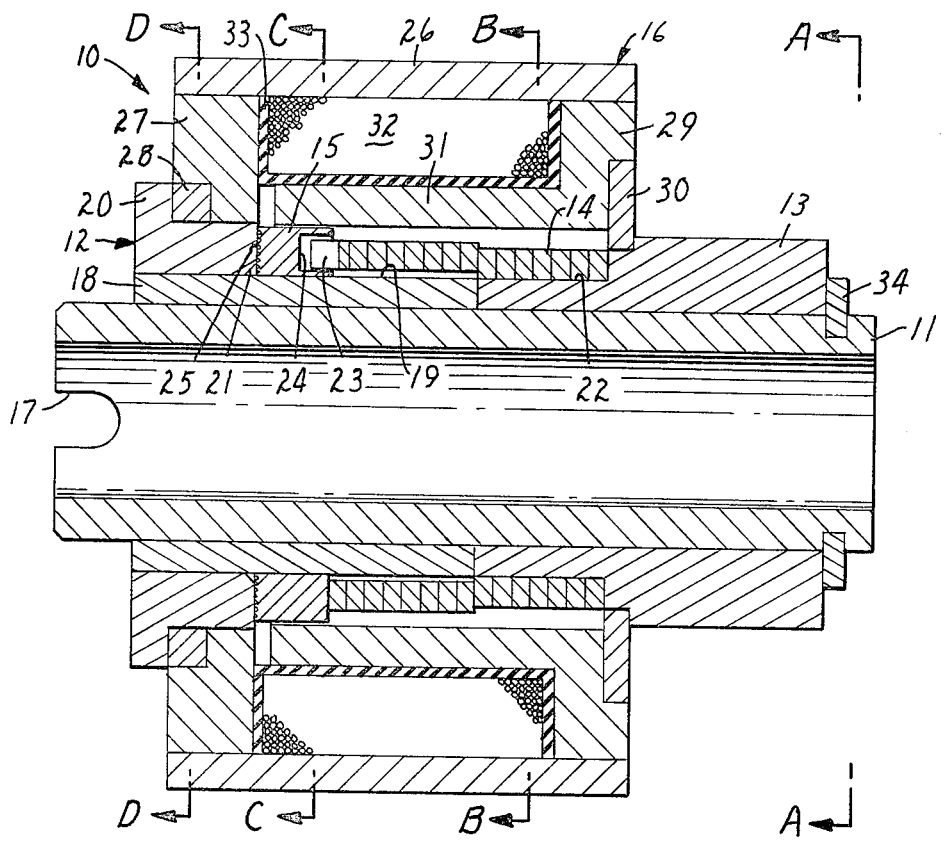
FIG. 1 is a sectional side elevation.
Figure 2:
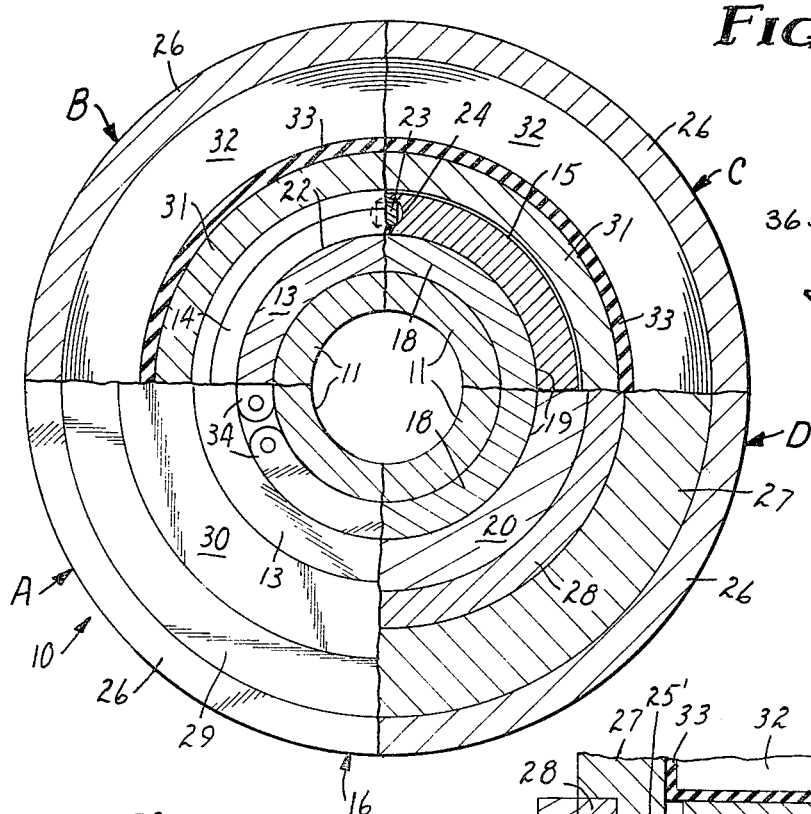
FIG. 2 is an end elevation, showing four quadrants sectioned as indicated in FIG. 1, of an exemplary form of electromagnetic spring clutch in accordance with the invention.

In the embodiment shown in FIGS. 1 and 2, the magnetic clutch 10 comprises a tubular shaft 11, a fixed hub assembly 12, a coaxially disposed roatable hub 13, a helical clutch spring 14 affixed to hub 13 and overlying a portion of hub assembly 12, a control ring 15, and an annular electromagnet assembly 16.

The tubular shaft 11 is provided with a keyway 17 for use in keying to a shaft, not shown, which is to be inserted within the shaft 11 for receiving torque therefrom.

The fixed hub assembly 12 is shown to consist of an inner tubular barrel 18 having a cylindrical outer surface 19, and a radially extending ferromagnetic ring 20, the two being fitted tightly together. The two-piece structure provides for convenience in manufacture and makes possible the use of non-magnetic material for the barrel component. Less desirably, the two may be combined in a unitary ferromagnetic structure. The ring portion is undercut at the inner edge 21 as shown, providing a relief void. The hub assembly is tightly affixed on the shaft 11, either by keying or preferably by a press fit.

Hub 13, which desirably is non-ferromagnetic, is rotatable about the shaft 11 and against the end of barrel 18. It has a cylindrical surface 22 equal in diameter to that of surface 19 of the barrel 18, which surface 22 carries a portion of the helical clutch spring 14 tightly wound thereon. The remainder of the spring is normally of sightly greater diameter so as to be freely rotatable about the barrel 18. Alternatively, the spring may have a constant diameter, the diameter of hub surface 22 then being appropriately increased to provide for the required tight fit. The free portion of the spring terminates in an axially extending tang 23 which fits into an opening 24 provided in the side of the control ring 15.

The ring 15 fits closely but rotatably about the cylindrical surface 19 of the hub assembly 12 and adjacent the radially extending inner end surface of the ring 20. The end surface 25 of the ring 15, or the surface of the ring 20 contacting the same is optionally lightly roughened, scored or grooved to provide additional relief voids, which assist in preventing or removing any slight accumulation of gummy deposits or other debris at the contacting end surfaces of ring and hub.

The magnet assembly 16 comprises a tubular shell 26, a centrally perforate endpiece 27 carrying a hard steel ring bushing member 28, an opposing endpiece 29 carrying a bushing member 30 and having an inner tubular axial extension 31, and an electromagnetic coil 32. The coil is solidly embedded within the ferromagnetic assembly in a hardened resinous matrix 33 and is provided with extended terminals, not shown, for connection to a control circuit.

A split ring 34 holds the assembled components in place.

In one mode of operation, the assembly is mounted with the shaft 11 supported on and keyed to a shaft of a device, such for example as a paper feed device, which is to be intermittently operated. The hub 13 is continuously rotated, for example by a source of power acting through a spur gear or a pulley, not shown, attached over the exposed large-diameter portion of the hub. The non-rotatable magnet assembly is anchored to a stationary frame, by means not shown, and the coil is connected through a suitable switch to an appropriate source of EMF. Upon activation, a magnetic circuit is established, the magnetic lines of flux passing directly and radially between endpiece 27 and hub member 20 and between extension 31 and ring 15. The ring 15 is attracted to and held in contact with the member 20, causing the rotating clutch spring 14 to wrap down onto and grip the surface 19 and resulting in rotation of the hub assembly 12 and shaft 11. Deactivation releases the ring 15 from the member 20, permitting the free portion of the spring 14 again to expand to its normal diameter and out of driving contact with the hub 12.

It will be seen that a reverse mode of operation is equally possible, wherein the shaft 11 and hub assembly 12 serve as the input function and hub 13 serves as the output function.

Concentricity of components is assured by forming the relatively softer endpiece 27 to a slightly lesser internal diameter than that of the hard steel ring 28 and then reaming the endpiece to match the diameter of the ring. The composite bearing surface thus produced provides uniform radial spacing, an accurate fit, and long life.

A particular advantage of the structure described is the minimizing of drag induced during activation. The magnetic forces, being applied substantially entirely in a radial direction and angularly balanced around the periphery, are effectively balanced or neutralized insofar as the introduction of mechanical drag is concerned. The small size and resulting minimal inertia of the control ring 15 also contributes to the minimizing of drag.

Figure 3:
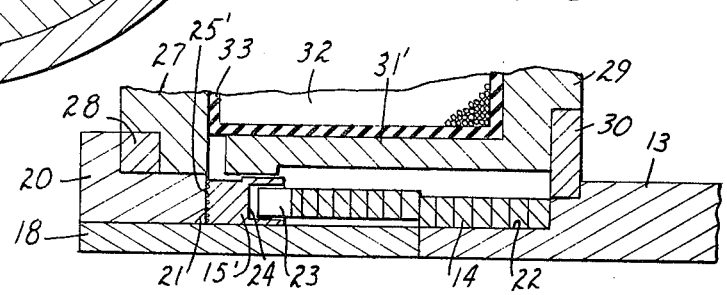

In the modified structure illustrated in FIG. 3, the inner surface of the extension 31' is increased in diameter about the clutch spring but remains of smaller diameter at the free end portion surrounding most of the control ring 15'. The outer surface of the ring 15' is reduced in diameter beneath the end of the extension 31', and extends past the small-diameter portion of the extension. With this slightly more complicated structure a slight further reduction in drag may be accomplished.

Figure 4:
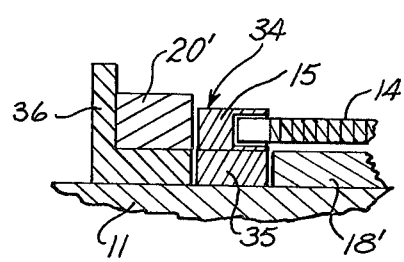
FIGS. 3 and 4 are sectional detail views showing significant portions of modified structures.

FIG. 4 illustrates another modification of the structure of FIG. 1. A control ring assembly 34, consisting of an outer ferromagnetic ring 15 affixed to an inner non-magnetic annular bearing member 35, is slidably positioned about the shaft 11 and between the appropriately shortened inner tubular barrel 18' and the non-magnetic flanged collar 36, both of which are fixed to the shaft. The flanged end potion of the ferromagnetic ring 20 of FIG. 1 has been omitted, the shoulder or ring 20' being fixedly held in place about the shaft by the collar 36 as indicated. As before, the magnetic lines of force pass radially between the ring 20' and the endpiece 27, and between the ring 15 and the extension 31. Braking action between rings 20' and 15, and contraction of spring 14 about the barrel 18' occur within microseconds upon activation of the electromagnet.

What is claimed is as follows:

1. In a spring clutch mechanism wherein a helical spring is caused to contract about and transmit torque to a hub member by a braking force applied to the free end coil of said spring, the improvement in braking means comprising a rotatable ferromagnetic control ring slidably supported axially adjacent and in torque-transmitting association with said end coil, a ferromagnetic ring rotating with said hub member and fixedly supported axially adjacent said slidably supported ring, and opposing non-rotatable polepiece means for directing peripherally angularly balanced magnetic lines of flux directly to said fixed ring and to said slidable ring in a direction radially of said rings.

2. The mechanism of claim 1 wherein said hub member includes a radially extending annular flange or shoulder forming said fixedly supported ring.

3. An electromagnetically actuated spring clutch comprising: a shaft; a first hub rotatably mounted on said shaft; a second hub fixedly mounted on said shaft axially adjacent said first hub; a helical clutch spring overlying adjacent portions of both hubs, affixed to said first hub and when in relaxed state free of said second hub; a ferromagnetic control ring supported on a non-magnetic bushing which is slidably and rotatably mounted on said shaft, said control ring being axially adjacent to and in torque-transmitting association with the free end coil of said spring; a ferromagnetic ring rotating with said second hub and fixedly supported axially adjacent said control ring; at least one pole piece with non-rotatable opposite poles, one adjacent said fixedly supported ring, the other adjacent said control ring, both being angularly balanced around the periphery and defining a magnetic path wherein magnetic lines of flux extend radially between said one pole and said fixedly supported ring and between said control ring and said other pole; and a selectively actuable flux generating means for generating said lines of flux.

4. An electromagnetically actuated spring clutch comprising: a shaft; a first hub rotatably mounted on said shaft; a second hub fixedly mounted on said shaft axially adjacent said first hub; a helical clutch spring overlying adjacent portions of both hubs, affixed to said first hub and when in relaxed state free of said second hub; a rotatable ferromagnetic control ring slidably supported axially adjacent to and in torque-transmitting association with the free end coil of said spring; a ferromagnetic ring, fixedly supported on a non-magnetic bushing which is affixed to said shaft, axially adjacent to said control ring and rotating with said second hub; at least one pole piece with non-rotatable opposite poles, one adjacent said fixedly supported ring, the other adjacent said control ring, both being angularly balanced around the periphery and defining a magnetic path wherein magnetic lines of flux extend radially between said one pole and said fixedly supported ring and between said control ring and said other pole; and a selectively actuable flux generating means for generating said lines of flux.

5. An electromagnetically actuated spring clutch comprising: a shaft; a first hub rotatably mounted on said shaft; a second hub fixedly mounted on said shaft axially adjacent said first hub; a helical clutch spring overlying adjacent portions of both hubs, affixed to said first hub and when in relaxed state free of said second hub; a rotatable ferromagnetic control ring slidably supported axially adjacent to and in torque-transmitting association with the free end coil of said spring; a ferromagnetic ring rotating with said second hub and fixedly supported axially adjacent said control ring; a pole piece overlying and enclosing said spring and control ring and comprising an outer tubular shell, a centrally perforate first endpiece fitting over and bearing on said fixedly supported ring, and an opposing end-piece fitting over and bearing on said first hub and having an inner tubular axial extension overlying said spring and terminating about said control ring and spaced from said first endpiece, the internal diameter of said axial extension being greater about said spring than about the central width of said control ring, and said control ring being of reduced external diameter adjacent said fixedly supported ring; said pole piece defining a magnetic path wherein magnetic lines of flux extend radially between said first endpiece and said fixedly supported ring and between said control ring and said axial extension; and a selectively actuable flux generating means for generating said lines of flux.

6. In a spring clutch mechanism wherein a helical spring is caused to wrap down about and transmit torque to a hub member affixed to a supporting shaft, by a braking force applied to the free end coil of said spring, the improvement comprising: a ferromagnetic control ring slidably supported axially adjacent to and in torque-transmitting association with said end coil; a ferromagnetic ring, fixedly supported on a non-magnetic bushing which is affixed to said shaft, axially adjacent to said control ring; and opposing non-rotatable polepiece means for directing peripherally angularly balanced magnetic lines of flux directly to said fixedly supported ring and to said control ring in a direction radially of said rings.

7. In a spring clutch mechanism wherein a helical spring is caused to contrast about and transmit torque to a hub member affixed to a supporting shaft, by a braking force applied to the free end coil of said spring, the improvement comprising: a ferromagnetic control ring supported on a non-magnetic bushing which is slidably and rotatably mounted on said shaft, said control ring being axially adjacent to and in torque-transmitting association with said end coil; a ferromagnetic ring affixed to said shaft in a position closely axially adjacent said control ring; and opposing non-rotatable polepiece means for directing peripherally angularly balanced magnetic lines of flux directly to said fixed ring and to said control ring in a direction radially of said rings.

8. In a spring clutch mechanism wherein a helical spring is caused to wrap down onto and transmit torque to a hub member affixed to a shaft, by a braking force applied to the free end coil of said spring, the improvement in braking means comprising: a ferromagnetic control ring rotatably and slidably supported axially adjacent and in torque-transmitting association with said end coil and magnetically isolated from said shaft; a ferromagnetic ring rotating with said hub member and fixedly supported axially adjacent said control ring; and opposing non-rotatable polepiece means for directing peripherally balanced magnetic lines of flux directly to said fixedly supported ring and to said control ring in a direction radially of said rings.

* * * * *